United States Patent
Lim et al.

[19]

[11] Patent Number: 6,058,172
[45] Date of Patent: May 2, 2000

[54] TELEPHONE WITH NOVEL FSK DECODING MEANS, SIMULTANEOUS OFF-HOOK CALLER ID RECEPTION MEANS, AND SET OF CONFIGURABLE FUNCTION KEY MEANS

[75] Inventors: Boon-Chen Lim; Zhi-Cheng Sun; Man-Chit Wong; Tin-Po Chan; Yeung-How Lim, all of Hong Kong, The Hong Kong Special Administrative Region of the People's Republic of China

[73] Assignee: Cybiotronics Limited, Hong Kong, The Hong Kong Special Administrative Region of the People's Republic of China

[21] Appl. No.: 09/099,271

[22] Filed: Jun. 18, 1998

Related U.S. Application Data

[60] Provisional application No. 60/052,168, Jul. 10, 1997.

[51] Int. Cl.[7] ............................ H04M 1/56; H04M 15/06; H03D 3/00; H04L 27/19
[52] U.S. Cl. ............................ 379/142; 379/373; 375/335
[58] Field of Search ........................ 379/142, 373, 379/376; 375/335; 329/300, 301, 303

[56] References Cited

U.S. PATENT DOCUMENTS

| | | | |
|---|---|---|---|
| 4,785,255 | 11/1988 | Lucak et al. | 329/303 |
| 5,550,505 | 8/1996 | Gaus, Jr. | 329/300 |
| 5,553,099 | 9/1996 | Carrol et al. | 375/334 |
| 5,781,621 | 7/1998 | Lim et al. | 379/142 |
| 5,835,581 | 11/1998 | Wu et al. | 379/142 |

*Primary Examiner*—Paul Loomis
*Attorney, Agent, or Firm*—Townsend and Townsend and Crew LLP

[57] ABSTRACT

A telephone device 100, integrated with a telephone or as a telephone add-on device, improves receipt and processing of network information such as Caller ID from conventional telephone networks. A comparator 103 decodes incoming Frequency Shifted Keying (FSK) signals by transforming transform the FSK signal into a square wave signal with corresponding periodic pulse widths. The transformed signal is sent to a microcontroller 105. The microcontroller is preprogrammed to further decode the transformed signal to obtain digital data representative of Caller ID information. Multiple devices connected to the same telephone line 410 may receive off-hook Caller ID simultaneously by selective disablement of an acknowledgment tone transmission through use of a switch 440. Configurable function keys 471 on a user interface 430 controls other network services, such as voice mail, regardless of different command code formats utilized by various network service providers. By grouping and selecting network service command codes, a user can automatically configure a telephone device to interact with the selected network service provider.

10 Claims, 5 Drawing Sheets

TELEPHONE WITH NOVEL FSK DECODING MEANS, SIMULTANEOUS OFF-HOOK CALLER ID RECEPTION MEANS, AND SET OF CONFIGURABLE FUNCTION KEY MEANS

CROSS-REFERENCES TO RELATED APPLICATIONS

This patent application relates to a U.S. Provisional patent application entitled "A Telephone with Novel FSK Means, Simultaneous Off-Hook Caller ID Reception Means, and Set of Configurable Function Key Means" U.S. application Ser. No. 60/052,168, which was filed on Jul. 10, 1997 of Lim, et al., the disclosure of which is incorporated by reference for all purposes.

BACKGROUND OF THE INVENTION

The present invention relates in general to a Caller Identification (Caller ID) receiving device, and more particularly to a novel device for decoding a Frequency-Shift Keying (FSK) signal which carries Caller ID information and other telephone network service operations.

Caller ID services provided by telephone companies have been found to be highly useful. By employing a Caller ID device which decodes Caller ID information sent via the telephone line, a user is able to view a caller's identity in a display area of the Caller ID device. Three types of Caller ID services and devices are presently in use. A first, and most basic, type is "on-hook" Caller ID, which displays Caller ID information when the telephone is not in use, i.e., when the telephone is in an on-hook state. A second type is "off-hook" Caller ID, which, in addition to on-hook Caller ID services, displays incoming Caller ID when the telephone is in use, i.e., when the telephone is in an off-hook state. Still yet a third type is called "Caller ID Deluxe," which, in addition to off-hook Caller ID, provides a set of function keys to access various network services. Caller ID Deluxe displays Caller ID information as well as information about accessible network services. A Caller ID Deluxe user decides which network service to use and accesses it by using a set of function keys.

Each of the three types of Caller ID devices first decode an incoming FSK signal, which contains encoded Caller ID information. Caller ID devices available in the market as either stand-alone add-on models or devices integrated with a telephone use complicated hardware FSK decoder circuitry for receiving Caller ID information. Such hardware decoder circuits are both costly and prone to reliability problems. Another option for FSK decoding that is presently available uses Digital Signal Processor technology. However, such technology is prohibitively expensive for standard Caller ID devices. The present invention is a new method and apparatus for inexpensive and reliable FSK decoding. Telephones and associated adjunct assets, such as a Caller ID unit, are mass market consumer products requiring minimal cost in order to effectively compete in the marketplace.

For off-hook Caller ID and Caller ID Deluxe, incoming Caller ID information arrives at any time while the telephone is in use, i.e. off-hook. The existing industry practice is to receive off-hook Caller ID when only one Caller ID device is in use. No off-hook Caller ID is received if multiple Caller ID devices are connected to the same line and in use simultaneously. The reason is that before transmission of off-hook Caller ID, a Caller ID device replies to an incoming telephone signal with a dual-tone multifrequency (DTMF) tone as an acknowledgment, in what is known as the handshaking sequence. If multiple Caller ID devices are in use simultaneously, or if, due to inevitable minor variations in the manufacturing of the devices, out of synchronization, the acknowledgment tone is distorted and the handshaking sequence fails.

More recently, a telephone device from Northern Telecom has been disclosed as capable of allowing multiple telephone devices connected to the same line to receive off-hook Caller ID simultaneously. This device first detects which unit among multiple units connected to the same line is the first to go to an off-hook status. The unit that goes off-hook first is designated as the master phone. Only the master phone will send the acknowledgment tone during the handshaking sequence for receiving off-hook Caller ID, thus ensuring that the acknowledgment tone is not distorted. However, this device has several disadvantages. First, detection of which unit goes off-hook first may fail due to noisy or otherwise unfavorable telephone network conditions, resulting in the wrong unit being designated as the master phone. Second, if two units go off-hook substantially simultaneously, the system may be unable to detect which unit goes off-hook first, resulting in a situation where no phone is designated master. It is therefore an objective of the present invention to provide a reliable and cost-effective method and apparatus for allowing multiple Caller ID devices to receive off-hook Caller ID simultaneously.

Caller ID Deluxe devices sometimes include a set of function keys. Each function key corresponds to, and is labeled with, an available network service operation. Examples of network services accessible with the function keys are: conference call; block call; etc. Alternatively, a network service may be one using an Interactive Voice Response (IVR) system. In an IVR system, after a user establishes a connection to an IVR server, the IVR audibly plays a menu of available operations to the user using a prerecorded voice message. After listening to a voice menu, the user may press one or several digit keys on a telephone to indicate his/her choice. A DTMF tone or a sequence of DTMF tones corresponding to the keys pressed are sent to the IVR server. The server then performs the appropriate operation according to the user's choice.

One of the most popular IVR services provided by telephone companies is voice mail. Voice messages intended for a user are recorded in a voice mail server. A user may later listen to the messages intended for him/her by using an IVR voice mail system. Typical voice mail operations that may be selected by DTMF tones include: playing a message; rewind; fast forward; skipping a message; saving a message; and, erasing a message.

Network services are more conveniently accessed by providing standard Caller ID devices with a set of function keys appropriate to the system. Operation of the keys automatically leads to generating a DTMF tone sequence used for accessing a service, so that the user does not have to memorize a sequence of codes required for each service. A disadvantage of such a device is that different network service providers use different DTMF tones for accessing a network services operation. A device with specific function keys programmed to access network services provided by one telephone company often cannot work with network services provided by another. The problem is more profound in the case of IVR services, as differences in the command codes used by different IVR services providers are likely to be greater. As a result, the utility of such a device is limited. Such a device may allow the user to manually change the DTMF tones generated by each function key, but doing so for the entire set of function keys would be both time consuming and inefficient.

SUMMARY OF THE INVENTION

The present invention provides an improved mechanism for receiving and processing Caller ID information. In one embodiment of a telephone circuit according to the present invention, a line interface circuit receives an FSK signal, a comparator transforms the FSK signal into a square wave signal, and a controller measures period widths and counts the transitions of the square wave signal to convert it into a data stream.

A comparator coupled to a microcontroller unit (MCU) provides for improved FSK decoding. An FSK signal normally contains two signals of different frequencies. For Caller ID, the higher frequency is 2200 Hz and the lower frequency is 1200 Hz. These frequencies represent binary 0 and 1, respectively. A time period of a square wave signal corresponding to signal frequency in an FSK signal also represents binary data. Based on this observation, a comparator transforms an FSK signal into a square signal which has a period that corresponds to the frequency of the original FSK signal. The comparator inputs the square signal to an MCU, which in turn measures the signal period in order to recover digital data.

In a second embodiment of a telephone device according to the present invention, a line interface unit receives Caller ID information and transmits an acknowledgment tone generated by a tone generator and used during the Caller ID handshaking phase. A controller processes the Caller ID information received and displays it, and meanwhile directs the sending of the acknowledgment tone. Instead of detection of the first unit that goes off-hook, the present invention uses a switch to designate one and only one unit to send the acknowledgment tone. The switch also prevents other units from sending the acknowledgment tone. The second embodiment allows multiple Caller ID devices to receive off-hook Caller ID signals simultaneously. The disclosed mechanism is both simple to implement and exhibits strong immunity to variations in telephone network conditions once the units have been set up correctly.

A third embodiment of a telephone device according to the present invention provides a Caller ID device with a set of configurable function keys which are compatible with different network services providers. In the telephone device, a set of network services operations, and their corresponding DTMF tones used by different network service providers to activate each operation, are pre-stored in the device. A user first selects one of the network service providers. A set of command codes is then retrieved from the pre-stored list based upon the user's selection, so that the function keys of the device are configured to send the appropriate DTMF tones to control the network service of the selected provider.

Each of the preferred embodiments of the telephone circuit or device discussed above may either be integrated into a conventional telephone or provided as an add-on device to a conventional telephone. A further understanding of the nature and advantages of the invention may be realized by reference to the remaining portions of the specification and the drawings.

DESCRIPTION OF THE PREFERRED EMBODIMENTS

Figure 1:
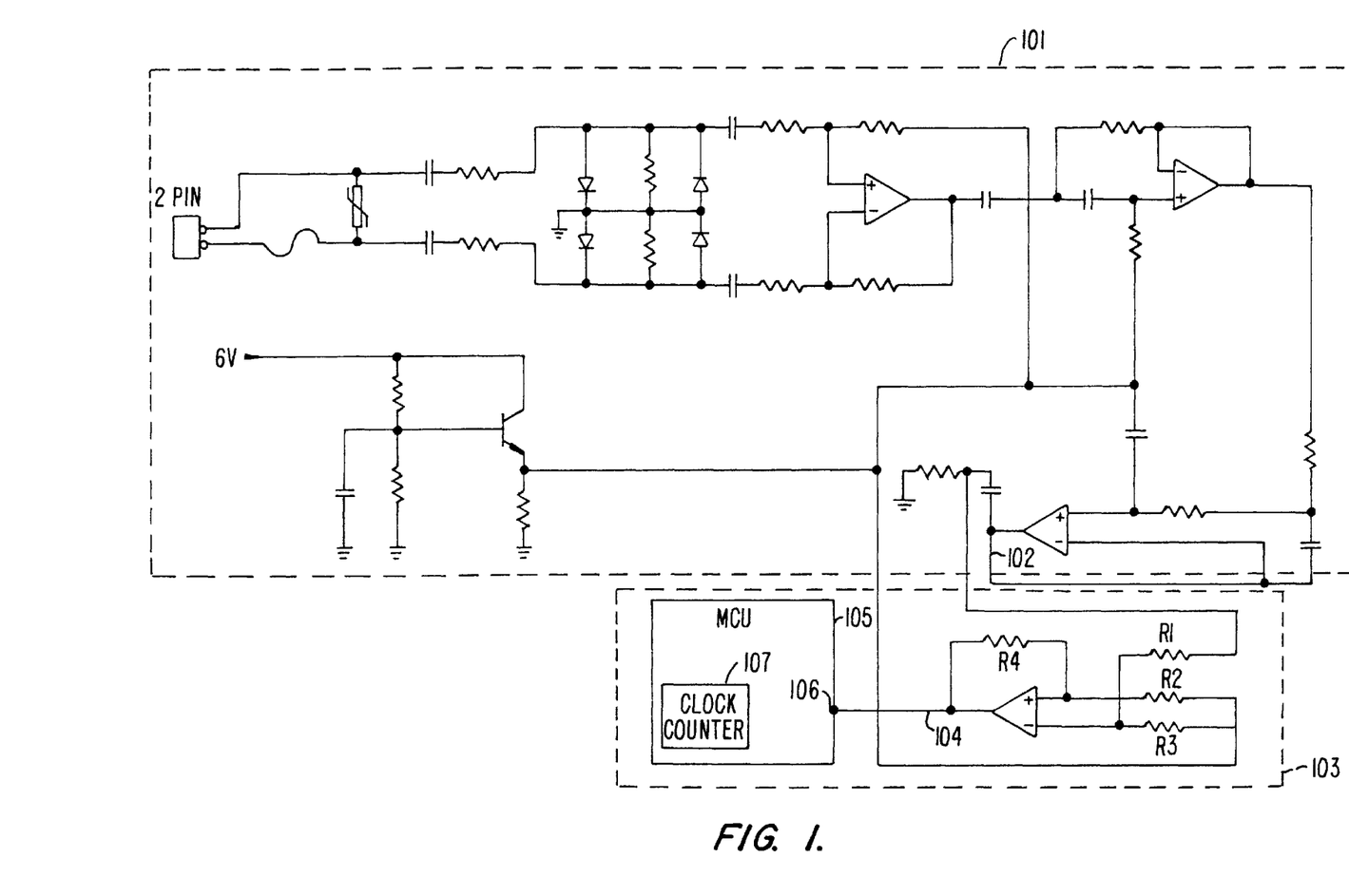
FIG. 1 is a schematic diagram of a circuit for receiving and decoding Caller ID according to one embodiment of the present invention.

FIG. 1 is a schematic diagram of line interface circuit 101 for receiving Caller ID. Circuit 101 is essentially similar to line interface circuits found in conventional Caller ID devices, with additional capabilities. For example, circuit 101 filters an FSK signal arriving from a telephone line. At point 102, a filtered version of the received FSK signal with reduced noise is available. Dynamic comparator circuit 103 transforms an FSK signal at point 102 into a square wave signal which has a periodicity corresponding to the frequency of the original FSK signal. The transformed signal is then available at point 104, which is connected to interrupt input port 106 of MCU 105. A clock counter 107 is available to the MCU 105 to oscillate the frequency of the MCU 105 to a typical range of 750 kHz to 1 MHz.

Figure 2:
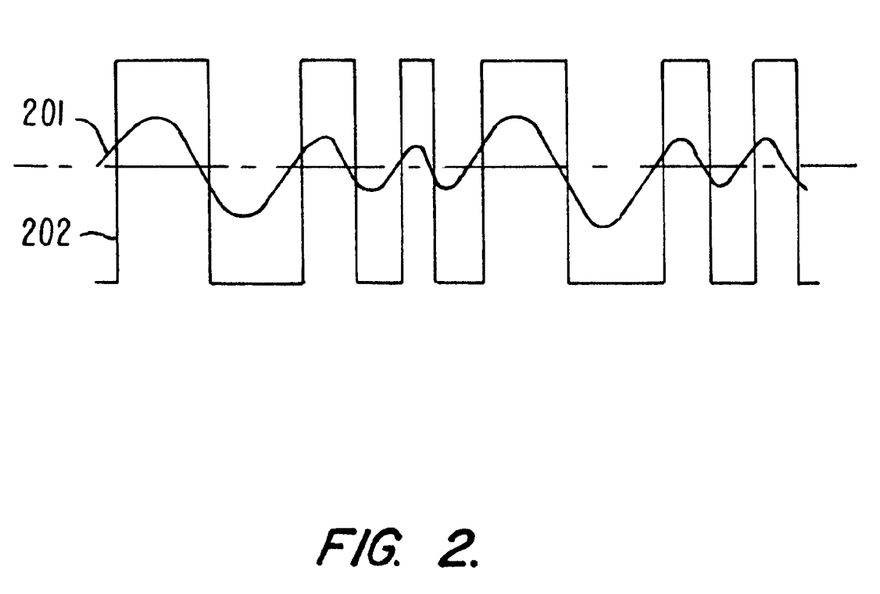
FIG. 2 is an illustration of the transformation of an FSK signal into a square wave signal.

FIG. 2 is an illustration of the transformation of an FSK signal into a square wave signal by the embodiment shown in FIG. 1 according to the present invention. The shape and property of a filtered FSK signal is shown in 201. The shape and property of the transformed signal is shown in 202.

Figure 3:
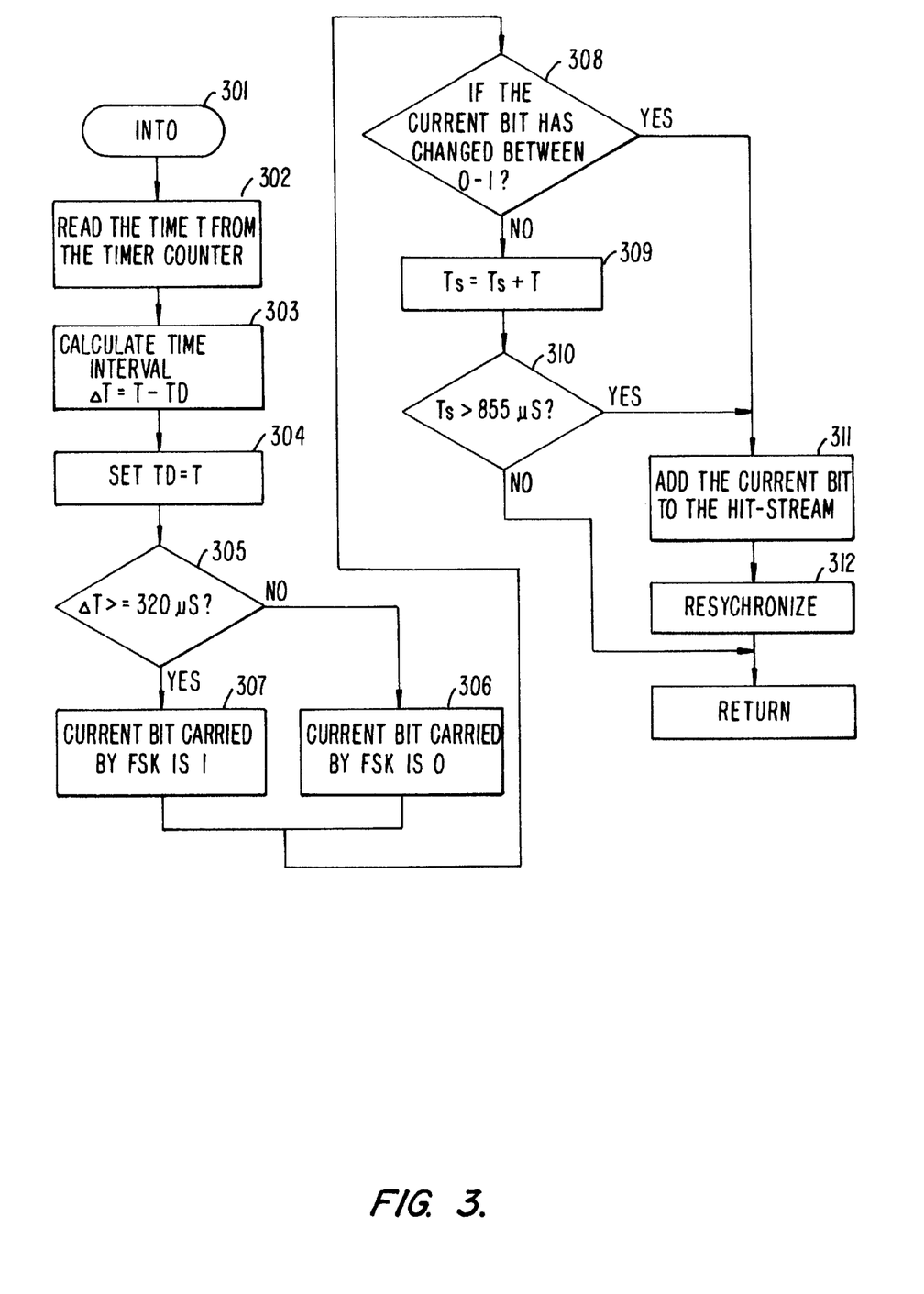
FIG. 3 is a flowchart of the steps involved in decoding an FSK signal according to one embodiment of the present invention.

FIG. 3 is a flowchart describing the steps involved in further decoding the transformed FSK signal to obtain the encoded digital signal. First, the comparator circuit 103 classifies and transforms the signal as described above. Next, the comparator inputs the transformed signal into the MCU 105 via the interrupt input port 106 at step 301, where the MCU 105 monitors the signal. MCU 105 records the time at which an interrupt occurs due to changes in the transformed signal at step 302. The MCU then calculates the time interval between the present interrupt and the previous interrupt, and resets, at steps 303 and 304 respectively. In this way, the MCU obtains the period width of the transformed FSK signal.

An FSK signal normally consists of at least two signals of different frequencies, each frequency representing a different value. In the preferred embodiment, the relatively higher frequency component is 2200 Hz and the relatively lower frequency component is 1200 Hz, representing binary data 0 and 1, respectively. The corresponding period widths of these two frequencies are 454 milliseconds and 833 milliseconds, respectively, and the half-period widths are 227 milliseconds and 416 milliseconds, respectively. Because transmitted FSK signals may experience phase shifts, the time interval between two interrupts is unlikely to match the above described time values exactly. Boundary values are therefore predetermined when classifying the signal according to the period width at steps 303 and 304. In a preferred embodiment, the average of the two time values above is chosen as the boundary value at step 305. When the calculated time interval is less than the predetermined boundary value, the MCU, at step 306, determines that the signal represents digital data "0". When the time interval is greater than the predetermined boundary value, the MCU, at step 307, determines that the signal represents digital data "1".

Upon determining the digital data value of the transformed FSK signal, the MCU 105 must be resynchronized with the next incoming FSK signal in order to make further calculations. The FSK signal transmitted via the telephone line is transmitted at a rate of 1200 baud. Thus, the time interval between each transmitted digital datum is 833 milliseconds. Clock counter 107 in MCU 105 maintains an oscillation frequency according to the transmission rate from the telephone line. When a group of successive time intervals between interrupts are of the same type (i.e., all time intervals in the group are greater than the boundary value or all are smaller than the boundary value), these time intervals are added together at step 309. When the accumulated sum reaches or exceeds 833 millisecond, the MCU, at steps 310 and 311, is able to confirm that one digital value has been received. Because phase shift of the signal would lead to variation in the actual time spent for transmitting each digital data, there would be some irregularity in the accumulated sum of the interrupt time intervals. Hence, at step 308, at the boundary of the decoded digital data "0" and "1", resynchronization is needed. Resynchronization is performed at step 312. The MCU 105 then prepares for the arrival of the next interrupt, and the process of decoding an FSK signal is repeated. Thus, the present invention provides an efficient method and apparatus for decoding an FSK signal used in Caller ID.

Figure 4:
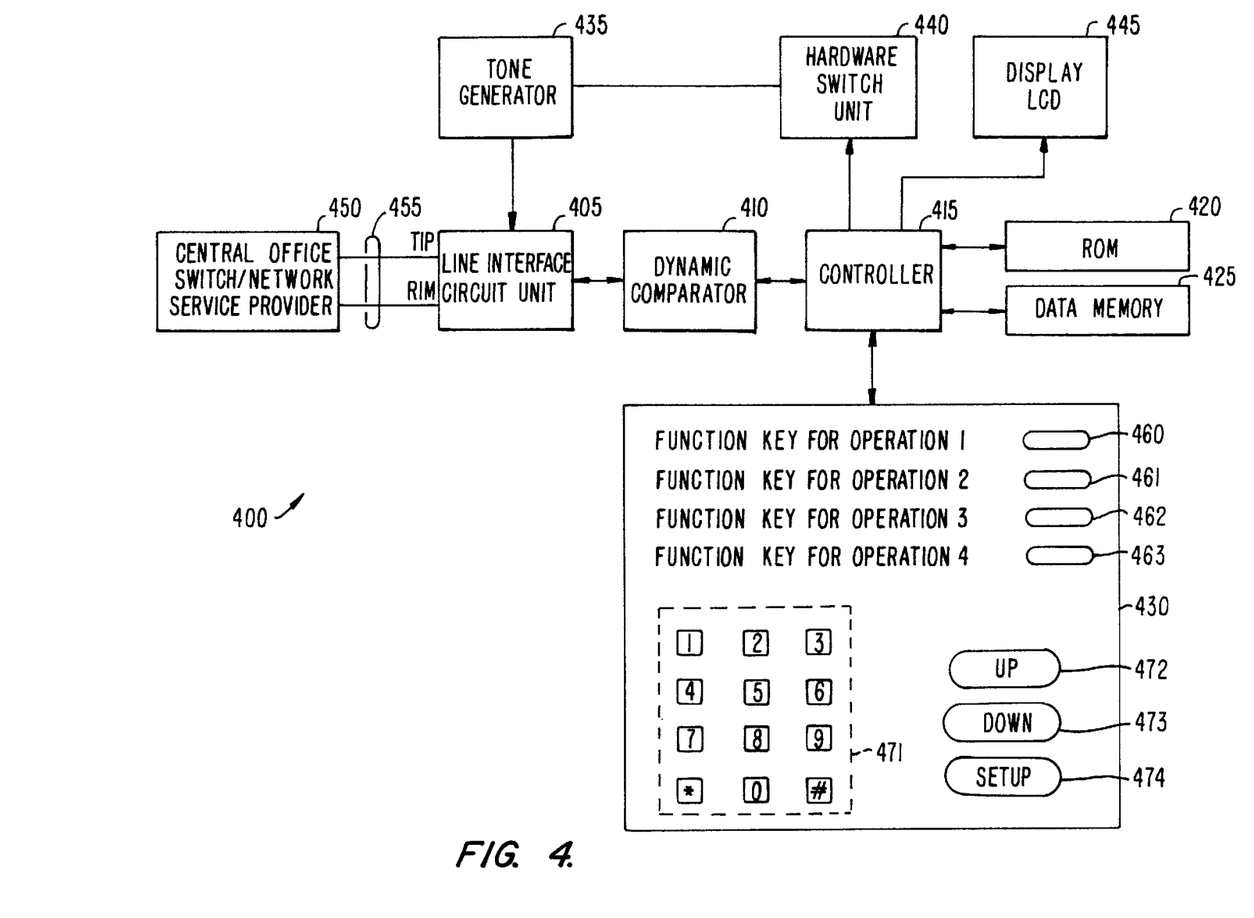
FIG. 4 is a block diagram of a telephone apparatus according to one embodiment of the present invention.

FIG. 4 shows a block diagram of a telephone circuit 400 comprising interface circuit unit 405, dynamic comparator unit 410, controller 415, read-only memory area 420, data memory 425, user interface 430, tone generator 430, hardware switch unit 440 and display unit 445. The interface circuit 405 connects to a commercial telecommunications switch 450 of via telephone lines 455. The telecommunication switch 450 may also be a server providing network services. The interface circuit 405 contains switching, control and line circuits required by telephone circuit 400 for establishing, maintaining and terminating the communication connection between the telephone apparatus and the telecommunications switch 450. Through this circuit, telephone circuit 400 sends to and receives from the telecommunication switch 450 switching and control signals.

Dynamic comparator 410 is functionally identical to comparator 103 in FIG. 1 and is used for decoding an incoming FSK signal, described in detail above. Controller 415 is a microcontroller unit (MCU) connected to other parts of the circuitry. In the preferred embodiment, the controller 415 is a commercially available device. It processes received Caller ID signals, customizes function keys 460 to 463, and sends information to a display unit 445 for display to the user. In the preferred embodiment, display unit 445 is a liquid crystal display (LCD). However, other types of display devices may also be employed, such as light emitting diode (LED) displays.

The read-only memory (ROM) 420 provides instructions to the controller 415 for controlling the various operating features and functions. ROM 420 also contains a database of network services operations corresponding to DTMF tones used by a large number of network services providers. The controller 415 uses a random access memory (RAM) 425 for storing and accessing data associated with performing various functions. A certain portion of the data memory is called the active command code area. This area is used for determining the command code sent by the apparatus when a function key is pressed.

The user interface 430 is also coupled to MCU 415, and includes a bank of keys 470 with which the user controls telephone circuit 400. In the preferred embodiment, the plurality of keys includes, but is not limited to, a numeric keypad 471, an UP key 472, a DOWN key 473, a SETUP key 474, and configurable function keys 460 to 463. The foregoing list is for exemplary purposes only and is not intended to limit the number or type of keys which may be employed in user interface 430.

The tone generator 435 generates an acknowledgment tone to a signal connection used during the handshaking phase of the transmission of off-hook Caller ID. Line interface circuit 405 transmits the acknowledgment tone to the telecommunication switch 450. Hardware switch 440 is located on the pathway between the input control of the tone generator 435 and the controller 415. It may enable or disable generation of the acknowledgment tone by the tone generator 435.

When multiple devices embodying the present inventions are connected to the same telephone line, the devices must first be properly configured by modifying the position of the hardware switch 440. Among all the units, the user selects one and only one of the devices as a "server". The selection is accomplished by putting the hardware switch 440 into the "server" position so that the input controls of the tone generator 435 controlling the generation of the DTMF D tone function normally. The user selects all other units as "client" by putting the hardware switch 440 into the "client" position, so that the input controls of the tone generator 435 are always disconnected and the DTMF D tone is sent by the tone generator. In this way, only one unit, the one designated "server", will be able to send the acknowledgment tone, while all units, including the "server" unit and all "client" units, are able to receive off-hook Caller ID information.

Figure 5:
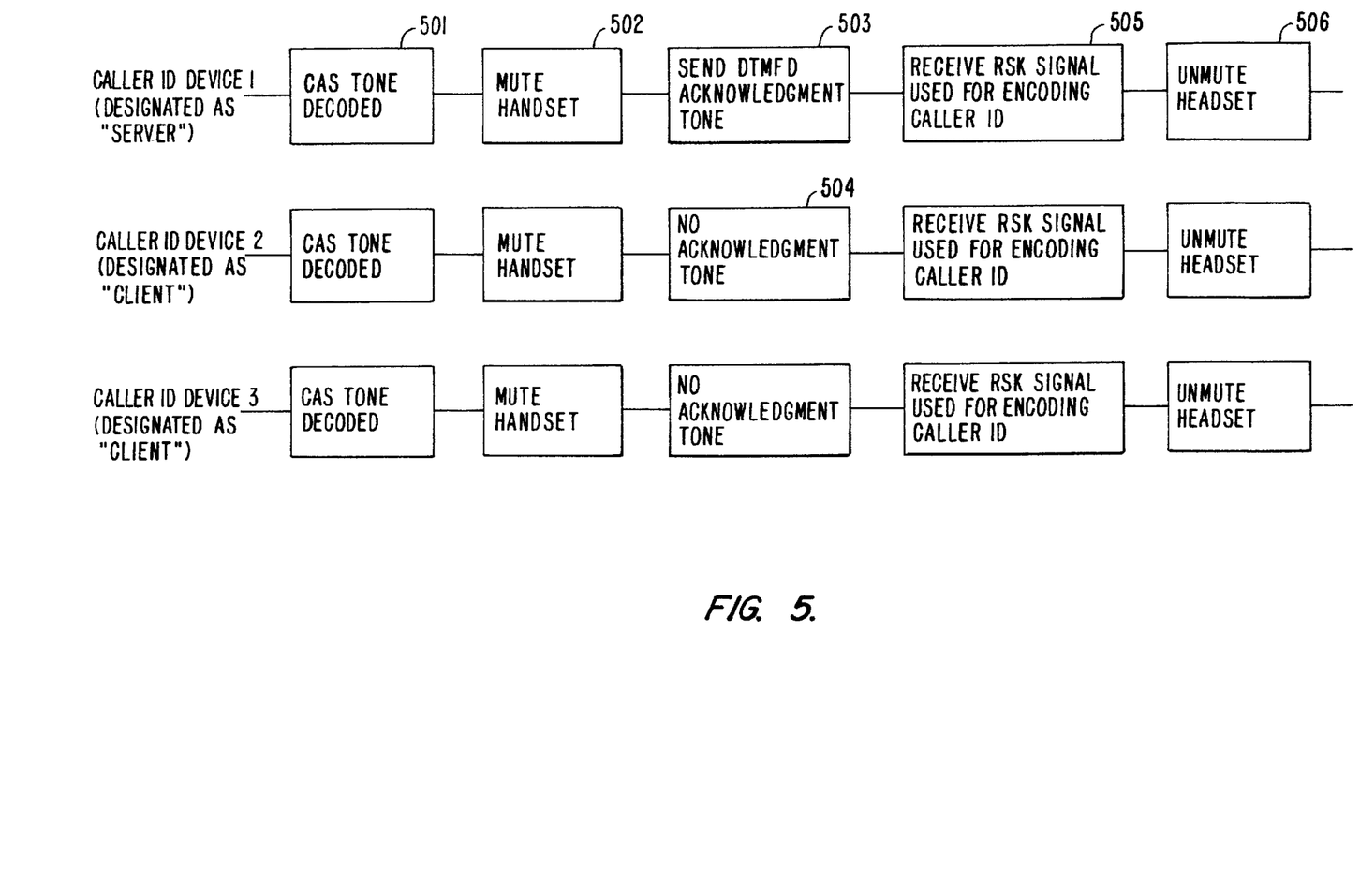
FIG. 5 is a diagram showing the handshaking sequence for simultaneous reception of Caller ID information according to one embodiment of the present invention.

FIG. 5 shows the off-hook Caller ID transmission handshaking sequence of a preferred embodiment. While a telephone conversation is in progress, before the Caller ID information is transmitted, a special CAS tone is first sent to the user's device. The CAS tone is detected by the device at 501. Because the device is capable of receiving off-hook Caller ID, it first mutes any handset attached to the device at 502 so the Caller ID transmission is not affected by any speech signals from the user's device. The "server" device and the "client" devices then behave differently. The "server" device sends the acknowledgment DTMF D tone at 503. However, for the "clients" devices, no acknowledgment tone is generated at 504. After the time allocated for acknowledgment tone transmission has elapsed, both the "server" and the "clients" are ready to receive FSK signals used for encoding off-hook Caller ID information at 505. After Caller ID is received and displayed, all devices un-mute their respective handsets so that the users' telephone conversation may resume.

The present invention provides a convenient scheme for allowing multiple off-hook Caller ID devices connected to the same telephone line to receive off-hook Caller ID simultaneously. Compared with prior art, the present invention does not require a determination of which unit goes off-hook first. Such an implementation is complex, expensive to build and has a low degree of reliability. In contrast, the present invention is cost-effective and highly reliable, and is immune to variations in telephone network conditions. Furthermore, the present invention is applicable to existing Caller ID devices with minimal modification of the hardware component and no modification at all of any software components, thereby reducing development time.

A third aspect of the preferred embodiment uses the numeric keypad 471, comprising the digit keys numbered 0–9 and the special keys "*" and "#", by which a user enters data, including telephone numbers, into telephone circuit 400. The UP key 472 and DOWN key 473, when pressed, cause the next item or the previous item to be displayed on display 445. The SETUP key 474, when pressed, causes controller 415 to retrieve information stored in the read-only memory (ROM) 420 so that the same information stored in ROM 420 configures the function keys 460 to 463. In the preferred embodiment, the function keys 460–463 control network service operations. When the network service accessed is voice mail, these keys are may be labeled "dial voice mail", "play", "forward", "rewind", "skip", "save" and "erase". When one of the function keys 460–463 is pressed, a command code in the form of a DTMF tone sequence is output. The command code causes the voice mail server of the selected service provider to perform the operation labeled on the corresponding function key. While a voice mail system is an example of a network service for which a set of configurable function keys is provided, it should be recognized that other network services can also be enabled by following the principle of the preferred embodiment.

Different service providers use different command codes. To enable the telephone apparatus and its configurable function keys to adapt to different sets of command codes used by different service providers, all the different command codes used by different service providers are pre-stored in the read-only memory (ROM) 420 for use with each voice mail operation. For example, the command code of a voice mail operation can be looked up from the ROM 420 on a service-provider-by-service-provider basis.

When a user first installs the telephone apparatus and uses it for accessing voice mail service, the user must first configure the apparatus and its function keys by pressing SETUP key 474. A name list of voice mail service providers recognized by the apparatus is shown on display 445. The user may use UP key 472 and DOWN key 473 to advance through a list to view the next or previous name in the list. The user indicates his/her final choice by pressing the SETUP key 474 again. Using the name of the voice mail service provider selected by the user, the controller 415 looks up the command codes used by that provider from the table prestored in the ROM 420. The command codes are then duplicated to the active command code area of the data memory 425, which determines the operation of the function keys. In this way, the operation of the function keys is configured by the user according to the voice mail service provider employed by the user.

After the configuration is completed, the function keys 460–463 are used for controlling voice mail operations. When the user wants to access his/her voice mail, he/she can press function key 460 which may be labeled "dial voice mail." The controller 415 identifies the key pressed, then looks up the active command code area of the data memory 425 to retrieve the telephone number of the voice mail service provider. The number is then dialed so that the apparatus becomes connected to the voice mail server via telephone line 455. Once the connection is established, the user may use the other function keys to perform voice mail operations. For example, when the user presses function key 462, which may be labeled "forward" while listening to a voice mail, the controller 415 looks up the active command code area of the data memory 425 to retrieve the command code for fast-forwarding used by the selected voice mail service provider. The command code is then sent over telephone lines 455 to the voice mail server, which then performs a fast-forward operation. Activation of other functions keys 460–463 also cause the controller 415 to look up the command code in the active command code area and retrieve and send the command code corresponding to a voice mail operation via telephone line 455.

A user would no longer need to memorize the command codes of all voice mail operations. Rather, the user can simply read labels of the function keys 460–463 and use the function keys to directly control voice mail operations. For example, when the DTMF code "3" and DTMF code "4" are used by the voice mail service providers A & B, respectively, for saving a voice mail message, the telephone apparatus is easily configured so that pressing the function key labeled "save" would generate command code DTMF "3" when voice mail service provider A is selected, but the same key would generate command code DTMF "4" when voice mail service provider B is selected. Whenever the user relocates this telephone apparatus to another geographical area or employs another voice mail service provider, the aforementioned SETUP key 474 can be used to re-configure function keys 460–463 to make them suitable for use with another voice mail service provider.

Users of a preferred embodiment of the telephone device can use configurable function keys 460–463 and 470 to augment a network application or Interactive Voice Response (IVR) Service operations such as playing a voice mail message, fast forward a voice message, rewind a voice message, etc. The function keys are labeled so that a single touch generates the command codes required by the selected network service provider despite each network service provider often using a distinctly different set of command codes. This configuration is accomplished simply by selecting the name of a voice mail service provider from a prestored list in ROM 420. The function keys are then automatically configured.

In the case where a voice mail service provider has changed some of the command codes it used or when no information about a voice mail server has been prestored in ROM 420, the preferred embodiment is supplied with a data acquisition means, as taught by pending U.S. patent application Ser. No. 08/622,460 "A Telephone With Data Acquisition Means," hereby incorporated by reference for all purposes. A network service provider sends an input signal to the telephone device of the present invention. In the input signal, the command code of each operation is identified and separated from all others by a special code. The controller 415 then decodes the received input signal to obtain the set of command codes, and stores the command codes to an active command code area of the data memory 420. In this way, the function keys are automatically configured to generate the appropriate command codes for the selected voice mail service provider.

While the above is a complete description of a preferred embodiment of the invention, various modifications, alternative constructions, and equivalents would be obvious to those skilled in the art. For example, different types of microprocessors may be used as the MCU 105. Also, the SETUP key 474 need not be an independent key and can be integrated with another key. Furthermore, the function keys may be implemented as "soft keys", where the labels of the keys are displayed in an LCD display panel adjacent to the keys instead of being printed on the keys, or the panel may be touch sensitive by pressing the label. It is therefore understood that other applications may be used without departing from the spirit and scope of the present invention. Accordingly, the above description should not be taken as limiting the scope of the invention which is defined by the appended claims.

What is claimed is:

1. A telephone circuit comprising:

a line interface circuit, coupled to a telephone line, for receiving an FSK signal;

a comparator, coupled to the line interface unit, for transforming the FSK signal into a square wave signal with period widths representing a frequency behavior of the FSK signal; and a controller, coupled to the comparator, for measuring the period widths of the square wave signal and for converting the period widths into a data stream corresponding to data encoded in the FSK signal, by determining if the period width has one of a plurality of relationship to one of a plurality of boundary values; and a resynchronization means, coupled to the controller, for causing the controller to resynchronize with the FSK signal to prepare to receive next data encoded in the FSK signal when there is a change in type of digital data obtained from the decoding.

2. The telephone circuit of claim 1, wherein the controller comprises an input port for monitoring changes in the square wave signal, and an internal clock for measuring a time interval between successive changes in the square wave signal.

3. The telephone circuit of claim 1 wherein the line interface circuit further comprises a filter for filtering out noise from the FSK signal.

4. The telephone device of claim 1, wherein said telephone device is integrated with a conventional telephone.

5. In a telephone circuit for receiving an FSK signal, a method for decoding the FSK signal, said method comprising the steps of:

(a) filtering the FSK signal to reduce noise and obtain a filtered FSK signal;

(b) converting the filtered FSK signal into a square wave signal with a period width representing the frequency behavior of the original FSK signal;

(c) measuring the period width of the square wave signal;

(d) comparing the period width of the square wave signal with a predetermined boundary value stored in a controller circuit;

(e) interpreting the square wave signal as digital data "0" when the period width has a first relationship to the predetermined boundary value, and interpreting the square wave signal as digital data "1" when the period width has a second relationship to the predetermined boundary value; and (f) resynchronizing the controller circuit with the square wave signal to prepare to receive the next data encoded in the said FSK signal.

6. The method of claim 5, wherein said first relationship is smaller than, and said second relationship is greater than.

7. The method of claim 5, wherein the step of measuring the period width of the square wave signal further comprises the step of measuring the time interval between successive changes in the square wave signal.

8. The method of claim 5, wherein the reception of one digital datum is completed and the received data is stored to a bit-stream for use by other applications after a predetermined time interval has elapsed.

9. The method of claim 5, wherein the step of resynchronization is performed after a change in the type of digital data obtained from the decoding is detected.

10. The method of claim 5, wherein the FSK signal consists essentially of a plurality of signals of distinct frequency which are time-separated from each other.

* * * * *